United States Patent [19]

Herr

[11] 4,285,842
[45] Aug. 25, 1981

[54] METHOD FOR PRODUCING A FIBROUS FIRE PROTECTION AGENT

[75] Inventor: Alfons K. Herr, Stutensee, Fed. Rep. of Germany

[73] Assignee: Kataflox Patentverwaltungs-Gesellschaft mbH, Karlsruhe, Fed. Rep. of Germany

[21] Appl. No.: 58,320

[22] Filed: Jul. 17, 1979

[30] Foreign Application Priority Data

Jul. 19, 1978 [DE] Fed. Rep. of Germany ....... 2831633

[51] Int. Cl.$^3$ .......................... C09D 5/18; C09K 3/28
[52] U.S. Cl. ................................. 252/607; 106/18.13; 252/604; 427/201; 427/425; 428/921
[58] Field of Search ....................... 252/8.1, 604, 607; 106/18.13; 427/196, 201, 425

[56] References Cited

U.S. PATENT DOCUMENTS

| | | | |
|---|---|---|---|
| 2,935,471 | 5/1960 | Aarons et al. | 252/8.1 |
| 3,380,842 | 4/1968 | Watson | 427/196 |
| 3,983,040 | 9/1976 | Draganov | 252/8.1 |
| 4,168,175 | 9/1979 | Shutt | 252/8.1 X |

*Primary Examiner*—Richard D. Lovering
*Attorney, Agent, or Firm*—Spencer & Kaye

[57] ABSTRACT

A method for producing a fibrous fire protection agent composed of a fibrous material with boric acid particles adhering to its surface, by providing a mass of such fibrous material having a moisture content of up to 80 percent by weight, intimately mixing in a mixer that mass of material with a quantity of powdered boron mineral material, spraying a quantity of concentrated sulfuric acid into the mixer during the mixing step to form a granulate, feeding the resulting granulate onto an evaporation line, and withdrawing the granulate from the evaporation line and comminuting the granulate in an impact pulverizer to form it into the fibrous fire protection agent.

13 Claims, 1 Drawing Figure

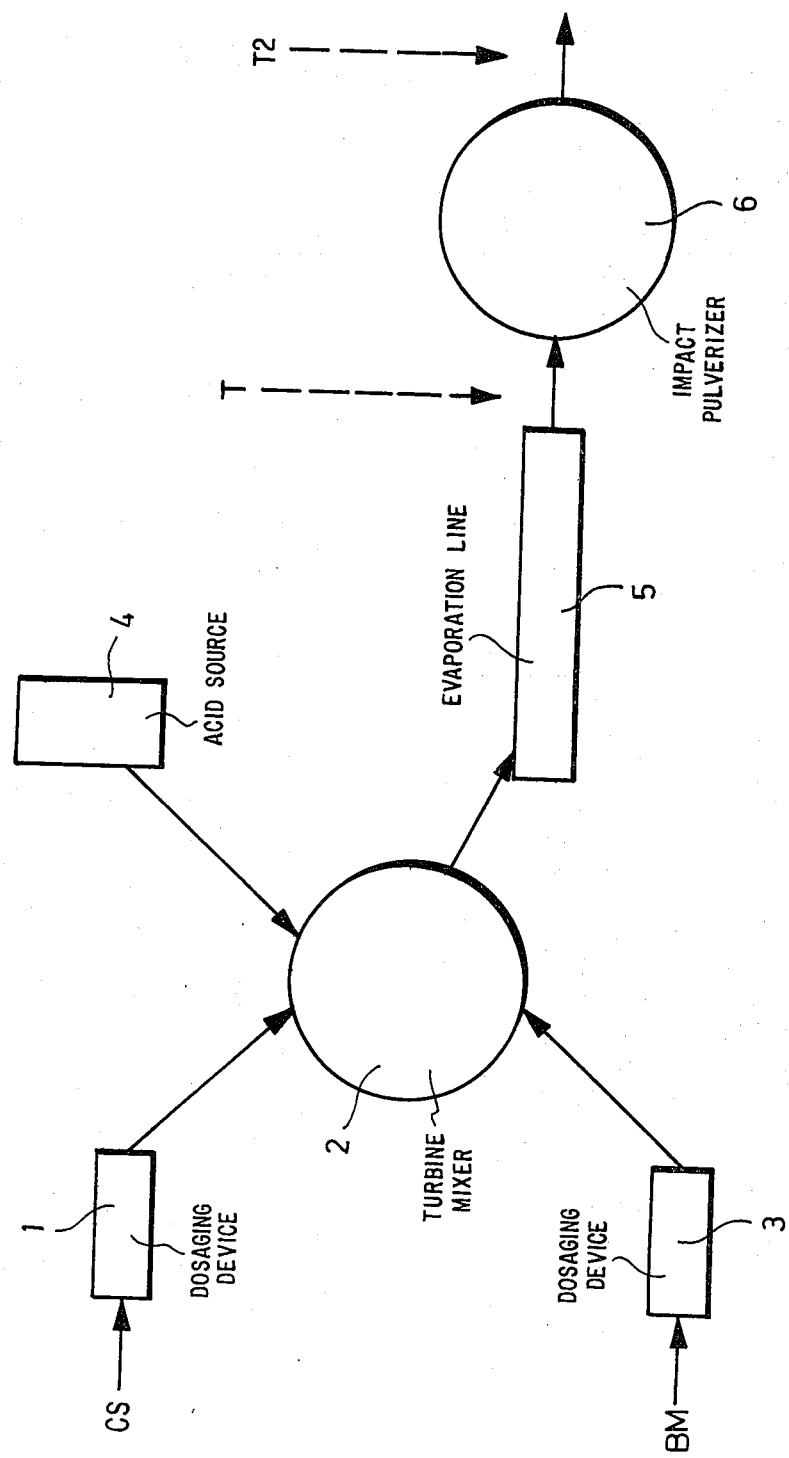

METHOD FOR PRODUCING A FIBROUS FIRE PROTECTION AGENT

BACKGROUND OF THE INVENTION

The present invention relates to a method for producing a fibrous fire protection agent composed of fibrous materials having boric acid particles adhering to their surfaces, and possibly other adhering materials, particularly glass and ceramic forming minerals.

Fire protection agents are available almost exclusively in the form of bromine, boron, or salts such as bromates, borates, phosphates, sulfates and the like. These salts are mixed, possibly with one another or with other additives, and are sold in ground or powdered form.

Such agents are all water soluble to a greater or lesser degree; therefore, the products to be protected are generally saturated with an aqueous solution of these salts. However, for many of the products to be protected, saturation is impossible; in such cases, the fire protection agents must then be mixed with or dispersed in powdered form among the raw materials serving to produce these products. Such admixture is successful, or results in homogeneous mixtures in which the fire protection agent is uniformly distributed throughout the entire volume of the product, only if such fire protection agents are mixed with other powdered substances.

If the starting raw materials are coarse-grained or of large-area or are raw materials having substantially different weights per unit volume than the fire protection agents, manufacture, and particularly the retention of a homogeneous mixture, becomes impossible since in the course of processing, the fire protection agents will separate again from the raw materials. For example, it is impossible to mix powdered boric acid with wood chips in order to produce fire protected chip boards since the boric acid particles separate from the wood chips already during spreading of the chip cake and collect at the bottom of the chip cake.

It has therefore been proposed to saturate such raw materials with the above-mentioned fire protection agent solution; but this is unacceptable not only for economic reasons but also because the raw materials are impossible to use if the saturation prevents bonding of the individual raw material particles to one another. This is again the case, for example, in the manufacture of wood chip boards where such a saturation impedes the gluing together of the individual wood chips in such a manner that the finished product no longer has the desired strength.

In order to overcome these difficulties, it has been proposed to utilize fire protective fibers, that is fibers which have adsorbed the fire protection agents. Such fibers do not demix from the coarse-grained or large-area raw materials even under heavy vibrations so that products made from these raw materials are provided with fire protection agents throughout their entire volume.

Various methods have been developed for bonding the fire protection agents to the fibers. A very economical and dependable method is grinding the powdered fire protection agents together with granulates containing fibers in an impact pulverizer, during which process the fire protection agents adhere to the fibers due to molecular attraction forces. A further prior art process using boric acid as the fire protection agent is carried out by mixing boron minerals with finely comminuted carrier substances, which may also be present in fibrous form, and then spraying the mixture with a mineral acid in such concentration and quantity that the boron minerals are converted to boric acid. During this process, the boric acid particles adhere to the finely dispersed carrier substances, again forming, if fibrous carrier substances are used, fire protective fibers.

The present invention relates more specifically to further developments of the last-mentioned process, using fibers as carrier substances but causing not only boric acid particles to adhere to the fibers but also further materials serving to provide fire protection for or an improvement of the materials for the products produced therefrom. Use is particularly made of glass and ceramic forming materials, which, in the case of fire, contribute greatly to increased fire protection by encapsulating the raw materials.

The manufacture of such fire protective fibers has previously been effected by mixing the dry fiber substances with the powdered boron minerals and then, in continuation of the mixing process, spraying in mineral acid in appropriate concentration and quantity. The prerequisite for the practice of this method is, firstly, the presence of dry fiber substances and powdered boron minerals and, secondly the presence of mineral acid in the appropriate concentration and quantity.

In order to economically produce such fire protective fibers it has also been proposed to use fibers which are carried along in residual waste water clarification sludges, particularly those originating from paper, cardboard and cellulose manufacture. The drawback of the use of these fibers is that these residual waste water clarification sludges must first be processed, particularly before being employed in the prior art method, and must be dried. It would also be advisable, for economic manufacture of the fire protective fibers, if concentrated sulfuric acid, which appears in large quantities as a byproduct in various industrial processes, could be used in the practice of the prior art method. However, with such cellulose fibers this is impossible since these fibers would be destroyed by the concentrated sulfuric acid. The sulfuric acid must therefore be diluted to a concentration of less than 50% by weight. Drying of the residual waste water clarification sludges as well as the required dilution of the sulfuric acid make the prior art method so much more expensive that fire protective fibers are used only with reluctance in spite of their eminent advantages.

A fire protective fiber material produced according to the prior art method contains, aside from the fiber, about 40–45 percent by weight boric acid, about 50–55 percent by weight calcium sulfate, with any remainder being water. In case of fire, the fire protective effect of these protective fibers is thus created exclusively by the action of the boric acid. Glass and ceramic forming minerals cannot be found in such a fire protective fiber.

SUMMARY OF THE INVENTION

It is therefore an object of the present invention to produce such a fire protective fiber in a more economical manner which permits the fiber to be simultaneously bonded to other materials suitable as fire protection.

This and other objects are achieved according to the invention by a method for producing a fibrous fire protection agent composed of a fibrous material with boric acid particles adhering to its surface, which includes providing a mass of such fibrous material having a moisture content of up to 80 percent by weight, intimately mixing in a mixer that mass of material with a quantity of powdered boron mineral material, spraying a quantity of concentrated sulfuric acid into the mixer during the mixing step to form a granulate, feeding the resulting granulate onto an evaporation line, and withdrawing the granulate from the evaporation line and comminuting the granulate in an impact pulverizer to form it into the fibrous fire protection agent.

The manufacturing method according to the invention thus differs significantly from that practiced in the prior art where dry fibers are mixed with powdered boron minerals and then sprayed with an acid of low concentration. In contrast, in the practice of this invention, clarification sludges with a moisture content up to 80 percent by weight are directly and intimately mixed with powdered boron minerals and highly concentrated sulfuric acid is then added to this mash-like mixture. This measure according to the invention not only eliminates the possibly required expensive drying of the sludges but also permits the use of less expensive concentrated sulfuric acid without the need for the otherwise required dilution. As a whole, this results in a very economical method for producing such fire protective fibers since, on the one hand, residual waste water clarification sludges, which otherwise would have to be dried and burned because their depositing within the foreseeable future is no longer possible, can be used in the state in which they are obtained and, on the other hand, a further waste product, i.e. concentrated sulfuric acid, can be used in an advantageous and extremely economical manner.

Additionally, the residual waste water clarification sludges of the paper or cardboard making industry and also those from the cellulose industry contain fibers which are already charged with minerals likewise serving fire protection purposes. These are, in particular, kaolins, talc, powdered chalk and titanium oxide, that is substances which are required or advisable for the formation of glass or ceramic, respectively. A further addition of minerals takes place in the reaction between the boron minerals and the sulfuric acid since the sodium or calcium, respectively, present in these minerals remains on the fibers. The sludges should not contain less than 50% by weight of water. The remainder of the sludge should consist of fibers and minerals.

The glass and ceramic forming materials are fixed on the fibers in the sludges. The reaction between boron minerals and sulfuric acid is very strong; it will be interrupted by adding of more boron mineral. There is no chemical reaction with the other materials.

Particularly in view of this further addition of minerals, it has been found satisfactory to use colemanite as the boron mineral, but the use of Rasorite can also be recommended if the fire protective fiber is to contain larger quantities of sodium.

A further possibility for loading, or adding to, the fibers is the addition, during the mixing process, of further powdered materials, fire protection salts or quite generally materials which are desired to be present in the final product. These materials may then participate in the conversion produced by the action of the sulfuric acid or in the oxidation, or they may not, depending on whether these materials are added into the mixer before or after the addition of the acid.

The conversion of the boron minerals into boric acid and calcium sulfate takes place exothermally. The mixture is thus heated to about 350° K. to 380° K., so that most of the added water as well as the released water evaporates on a subsequent evaporation line. Downstream of the evaporation line, there will then be available granulates having a moisture content—depending on the moisture content of the fiber substances or of the clarification sludge and of the proportion of boron minerals or sulfuric acid,—of between 2 and 30 percent, by weight. The granulates can thus generally be introduced into an impact pulverizer without further drying and can there be separated back into fibers. Not only boron acid particles thus adhere to the fiber, but also the materials desired to be present in the final product, in particular the glass and ceramic forming materials which have been found to be particularly appropriate as fire protection. These glass and ceramic forming minerals include kaolins and silicates (silicates of alumina and magnesia) with flux (sodium carbonate and especially boric acid). Of course there also exists the possibility of providing a further dryer downstream of the evaporation line as well as downstream of the pulverizer in order to obtain the material with the desired moisture content or to realize an optimum energy consumption for drying and separation of the fibers.

Experiments have shown that fire protective fibers are formed which have excellent fire inhibiting properties if residual waste water clarification sludges from paper making factories are used with the following starting components: fibers, absolutely dry, 10 to 75 percent by weight; boron minerals 25 to 65 percent by weight, concentrated sulfuric acid (96%) 15 to 35 percent by weight.

The object of significantly reducing the cost of manufacture of such fire protective fibers and of providing an opportunity to cause the desired additive substances to adhere to these fibers even in the final product is thus met.

BRIEF DESCRIPTION OF THE DRAWING

The sole FIGURE is a schematic diagram of one system for carrying out methods according to the invention.

DESCRIPTION OF THE PREFERRED EMBODIMENTS

The method according to the invention will now be explained in detail with reference to a flow scheme shown in the FIGURE, and to several examples. As shown in the FIGURE, residual waste water clarification sludge CS originating from the waste water of a paper making factory and having a moisture content of up to 80 percent by weight is fed via a dosaging device 1 to a turbine mixer 2. Through a further dosaging device 3 powdered boron minerals BM are also fed into the mixer 2.

In the mixer, the clarification sludge is mixed intimately with the powdered boron minerals, so that a mash-like mixture results.

After this first mixing step, concentrated sulfuric acid is likewise added to the mixer from a vessel 4 during the ongoing mixing process, thus starting conversion of the boron minerals into boric acid and calcium sulfate. Once the mixing process is completed, the mixture is brought onto an evaporation line 5 with the majority of the water contained in the mixture is allowed to evaporate.

Then the material, which now is a granulate, is fed into an impact pulverizer 6 where the granulate is comminuted into individual fibers. Between the evaporation line 5 and the pulverizer 6 there may then be disposed a dryer T; subsequent drying can also be effected downstream of the pulverizer 6 by means of a secondary dryer T2 connected at that point.

The evaporation line (5) could be a ventilated trough-chain-conveyor. This conveyor is 9 m long; the granulate remains on it for about 4 to 6 minutes. On the conveyor is given 150 kg granulate in each charge. In the beginning of the evaporation line the granulate has a temperature of more than 350° K.; it is cooled continuously on the evaporation line to a final temperature of about 310° K. The granulate leaving the evaporation line is nearly globular with a diameter between 5 mm and 25 mm.

EXAMPLE 1

Charges of 120 kg residual waste water clarification sludge originating from a fine paper making factory and containing solids of about 33 percent by weight (moisture content 67 percent by weight) and 172 kg colemanite with a 45% boron trioxide content are fed into the turbine mixer 2 and are there mixed for 4 minutes. The residual waste water clarification sludge contains, by weight 55% very fine fibers, and 45% of less than 20 denier minerals which include, for example, kaolin, silicate of alumina, silicate of magnesia, and titanium oxide. Thereafter, 73 kg of concentrated sulfuric acid (96%) are sprayed in while mixing continues and the entire mixture is homogenized for 2 more minutes. Then, the mixture is discharged to the evaporation line 5. The granulate remains on the evaporation line about 4 to 6 minutes. In the beginning of the evaporation line the granulate has a temperature of more than 350° K.; it is cooled continuously on the evaporation line to a final temperature of about 310° K.

A granulate results which has a residual moisture content of less than 20 percent by weight of water. In this form, the granulate is fed into the impact pulverizer 6 and there separated into a fibrous substance which can be dried further to the desired residual moisture content of 2 to 5 percent by weight.

The result is a fibrous fire protection agent in which boric acid and calcium sulfate as well as the materials required in the manufacture of fine paper, and present in the original sludge, i.e. silicic acid, alumina, magnesia silicate and lime adhere to the fibers. This fire-protection agent, known as a fire-protective fiber, is suitable for imparting effective and long-lasting fire inhibiting properties to, for example, board-shaped building materials, profiles and molded bodies of wood or plastic by being mixed therewith before processing.

EXAMPLE 2

The same quantities of identical compositions of sludge, acid and colemanite as in Example 1 are fed into the turbine mixer 2. Upon completion of this mixing process, an additional 5.7 kg of ammonium bromide is added to the turbine mixer 2 in finely pulverized form and mixing is continued for 2 more minutes. In the mixer were given 172 kg colemanite
73 kg sulfuric acid
5.7 kg ammonium bromide After passage through the evaporation line 5 and the impact pulverizer 6, there is obtained a fibrous fire protection agent which is of significance for meeting certain international standards. In addition to boric acid and the above-mentioned minerals, an additional quantity of about 1.9% by weight $(NH_4)_2SO_4$ and about 2.6% by weight $NH_4BR$ adhere to the fibers of this fire protection agent. Added is only ammonium bromide $(NH_4Br)$; ammonium sulphate $((NH_4)_2SO_4)$ is developing out of the reaction of the sulfuric acid with the boron mineral.

In the same manner, flame protectants other than ammonium bromide, for example phosphates, (monoammonium phosphate, diammonium phosphate) boron and borates, other bromides or sulfates, sodium trisilicate can be added in finely pulverized form or sprayed in in solution. In special cases, it may also be advisable to add this fire protection agent or minerals or even chemicals to the mixture before the sulfuric acid is added.

A reaction with the added sulfuric acid is only possible with ammonium phosphate; it changes to ammonium sulphate and phosphoric acid. All other minerals will be added after the reaction between the sulfuric acid and the boron minerals.

The residual waste water clarification sludge and in general all sludges which are qualified according to the invention should contain more than 40 percent by weight of fibrous materials and more than 1 percent of weight but less than 60 percent of weight of minerals. The residual waste water clarification sludges of the paper or cardboard industry and also those from the cellulose industry and even communal residual waste water sludges are qualified.

Table I, below, contains a listing of the residual water- and ash-content as well as the length of fibers present in the sludge of twelve manufacturers.

TABLE I

| Manufacturer | water percent by weight | ash percent by weight | length of fibers in millimeters |
|---|---|---|---|
| 1 | 65 | 40–60 | 0–3 |
| 2 | 68 | 40–50 | 0–3 |
| 3 | 65 | 35–45 | 1–4 |
| 4 | 72.5 | 18 | 3–6 |
| 5 | 56.4 | 66.5 | 0–3 |
| 6 | 75.2 | 73 | 0–5 |
| 7 | 56 | 38.67 | 0–4 |
| 8 | 71 | 15.0 | 0–2 |
| 9 | 79 | 11.7 | 0–3 |
| 10 | 84.2 | 2.95 | 3–5 |
| 11 | 78 | 1.88 | 3–5 |
| 12 | 80 | 0.84 | 3–5 |

Boron materials which can be used preferably include colemanite and rasorite but also boracite $(Mg_6(Cl_2B_{14}O_{26}))$, borax $(Na_2B_4O_7.10H_2O)$, pandermite $(Ca_5B_{12}O_{23}.9H_2O)$ and ulexite $NaCaB_5O_9.8H_2O$.

It will be understood that the above description of the present invention is susceptible to various modifications, changes and adaptations, and the same are intended to be comprehended within the meaning and range of equivalents of the appended claims.

What is claimed is:

1. A method for producing a fibrous fire protection agent composed of a fibrous material with boric acid particles adhering to its surface, comprising: providing a wet mass of such fibrous material having a moisture content of up to 80 percent by weight; intimately mixing in a mixer that mass of material with a quantity of powdered boron mineral material; spraying a quantity of concentrated sulfuric acid into the mixer during said mixing step to form a granulate; feeding the resulting granulate onto an evaporation line; and withdrawing the granulate from the evaporation line and comminuting the granulate in an impact pulverizer to form it into the fibrous fire protection agent.

2. Method as defined in claim 1 wherein the agent further contains a glass forming or ceramic forming mineral adhering to the surface of the fibrous material.

3. Method as defined in claim 1 wherein the fibrous material is constituted by clarification sludge derived from residual waste water resulting from the production of paper or cellulose.

4. Method as defined in claim 1 wherein the powdered boron material is colemanite with a boron content of more than 30% by weight.

5. Method as defined in claim 1 wherein, during said steps of mixing and spraying, the total quantity of ingredients in the mixer includes an amount of fibrous material having a totally dry weight of 10 to 75% of the total quantity, an amount of boron mineral having a weight equal to 25 to 65% of the total quantity, and an amount of concentrated sulfuric acid having a weight equal to 15 to 35% of the total quantity.

6. Method as defined in claim 1 or 5 wherein the sulfuric acid has a concentration of 96%.

7. Method as defined in claim 1 wherein said step of withdrawing includes drying the granulate in a dryer after it leaves the line.

8. Method as defined in claim 1 further comprising drying the fibrous agent in a dryer after said step of comminuting.

9. Method as defined in claim 1 wherein said step of mixing further comprises introducing into the mixer at least one additional fire protection salt desired in the agent.

10. Method as defined in claim 1, or 3, or 5, wherein the mass of such fibrous material contains not less than 50 percent by weight water.

11. Method as defined in claim 10, wherein the sulfuric acid has a concentration of 96%.

12. Method as defined in claim 1, or 3, or 5 wherein the mass of such fibrous material contains water in a quantity which is sufficient to prevent such fibers from being destroyed by concentrated sulfuric acid.

13. Method as defined in claim 12, wherein the sulfuric acid has a concentration of 96%.

* * * * *